(12) United States Patent
Roberts (10) Patent No.: US 7,195,848 B2
(45) Date of Patent: Mar. 27, 2007

(54) METHOD OF MAKING INLAID COLOR FILTER ARRAYS

(75) Inventor: Luther C. Roberts, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 279 days.

(21) Appl. No.: 10/930,008

(22) Filed: Aug. 30, 2004

(65) Prior Publication Data

US 2006/0046164 A1    Mar. 2, 2006

(51) Int. Cl.
  *G02B 5/20* (2006.01)
(52) U.S. Cl. .......................................... 430/7; 430/199
(58) Field of Classification Search ...................... None
  See application file for complete search history.

(56) References Cited

U.S. PATENT DOCUMENTS

| | | | |
|---|---|---|---|
| 4,007,372 A | 2/1977 | Lenhard et al. |
| 4,081,277 A | 3/1978 | Brault et al. |
| 4,147,572 A | 4/1979 | Vodakov et al. |
| 4,196,009 A | 4/1980 | Martin et al. |
| 4,207,119 A | 6/1980 | Tyan |
| 4,266,017 A | 5/1981 | Martin et al. |
| 4,315,096 A | 2/1982 | Tyan et al. |
| 4,383,018 A | 5/1983 | Martin et al. |
| 4,543,275 A | 9/1985 | Akashi et al. |
| 4,743,463 A | 5/1988 | Ronn et al. |
| 4,764,670 A | 8/1988 | Pace et al. |
| 4,793,692 A | 12/1988 | Kamio et al. |
| 4,804,977 A | 2/1989 | Long |
| 4,876,167 A | 10/1989 | Snow et al. |
| 4,877,697 A | 10/1989 | Vollmann et al. |
| 4,911,733 A | 3/1990 | Matsumoto et al. |
| 4,923,860 A | 5/1990 | Simons |
| 4,965,242 A | 10/1990 | DeBoer et al. |
| 4,978,652 A | 12/1990 | Simons |
| 5,059,500 A | 10/1991 | Needham et al. |
| 5,073,534 A | 12/1991 | Harrison et al. |
| 5,079,214 A | 1/1992 | Long et al. |
| 5,140,396 A | 8/1992 | Needham et al. |

(Continued)

FOREIGN PATENT DOCUMENTS

JP    58-34961    3/1983

(Continued)

OTHER PUBLICATIONS

Böttcher et al., "Fabrication of Evaporated Dye Films and their Application," *J. Mater. Chem.*, 1993, 3(12), 1187-1197.

(Continued)

*Primary Examiner*—John A. McPherson
(74) *Attorney, Agent, or Firm*—Peyton C. Watkins (57) ABSTRACT

A method of making a color filter array on a first substrate comprising the steps of: providing at least one transferable colorant layer on a second substrate and positioning such transferable layers in transferable relationship with but spaced a distance from the first substrate; and heating the second substrate sufficiently to simultaneously transfer the colorant materials from the heat transferable colorant layers to the first substrate. An etch process is used to form openings in the first colorant, into which subsequent colorants are deposited.

11 Claims, 8 Drawing Sheets

U.S. PATENT DOCUMENTS

| | | |
|---|---|---|
| 5,166,126 A | 11/1992 | Harrison et al. |
| 5,168,406 A | 12/1992 | Nelson |
| 5,235,198 A | 8/1993 | Stevens et al. |
| 5,252,425 A | 10/1993 | Bagchi |
| 5,304,499 A | 4/1994 | Bonnet et al. |
| 5,312,779 A | 5/1994 | Nelson |
| 5,340,619 A | 8/1994 | Chen et al. |
| 5,358,923 A | 10/1994 | Mitsuhata et al. |
| 5,366,764 A | 11/1994 | Sunthankar |
| 5,463,484 A | 10/1995 | Brody |
| 5,521,035 A | 5/1996 | Wolk et al. |
| 5,529,884 A | 6/1996 | Tutt et al. |
| 5,536,333 A | 7/1996 | Foote et al. |
| 5,538,831 A | 7/1996 | Oshima et al. |
| 5,576,265 A | 11/1996 | DeBoer et al. |
| 5,677,202 A | 10/1997 | Hawkins et al. |
| 5,747,199 A | 5/1998 | Roberts et al. |
| 5,756,240 A | 5/1998 | Roberts et al. |
| 5,776,641 A | 7/1998 | Roberts et al. |
| 5,811,156 A | 9/1998 | Roberts |
| 5,874,188 A * | 2/1999 | Roberts et al. ............ 430/7 |
| 5,900,339 A * | 5/1999 | Roberts et al. ............ 430/7 |
| 5,981,112 A * | 11/1999 | Roberts ..................... 430/7 |

FOREIGN PATENT DOCUMENTS

| | | |
|---|---|---|
| JP | 59-78312 | 5/1984 |
| JP | 59-126506 | 7/1984 |
| JP | 59-177365 | 10/1984 |

OTHER PUBLICATIONS

Fritz et al., "Investigations on Indirect Structuration Of Evaporated Dye Layers," *J. Inf. Rec. Mater.* 16 (1988) 1, 43-49.

Böttcher, et al., "Preparation Of Color Filter Arrays For Solid State Devices," *Progress in Basic Principles of Imaging Systems*, Vieweg-Verlag, 1987, Ed. F. Granzer and E. Moisar, pp. 639-643.

* cited by examiner

METHOD OF MAKING INLAID COLOR FILTER ARRAYS

CROSS REFERENCE TO RELATED APPLICATIONS

The present invention is related to U.S. Pat. No. 5,688,551, issued on Nov. 18, 2997 and entitled "Method of Forming an Organic Electroluminescent Display Panel," by Littman, et al.

FIELD OF THE INVENTION

The present invention relates to a method of making color filter arrays which are suitable for display applications such as liquid crystal displays or light emitting diode displays and are particularly suitable for use on image sensors, either as an integral part of the sensor or as an optical element that is used in conjunction with the sensor.

BACKGROUND OF THE INVENTION

In making color filter arrays, separate layers of different colors must be formed. Frequently these layers are formed using dye as the colorant material which is imbibed into dye receiving layers which must be of a controlled thickness, and a precise amount of dye must be used to achieve the appropriate color. See, for example, commonly assigned U.S. Pat. No. 4,764,670 to Pace et al., U.S. Pat. No. 4,876,167 to Snow et al., and U.S. Pat. No. 5,576,265 to DeBoer et al. which describe such a process. An additional problem associated with this process is that the dye receiving layers swell upon the introduction of dyes, often overlapping one another and also limiting the smallest dimension which can be attainable for use over very small filter elements. In addition, the dyes spread within the dye receiving layer, resulting in loss in edge sharpness of the filter elements. Another problem with this process is that dyes are susceptible to fading on exposure to light.

In another method for making color filter arrays, colorant material is dispersed in a photoactive polymer solution. The dispersion is processed as a typical photoresist would be, with the exception that much greater light intensities are needed for exposure.

One problem encountered in both the use of dispersions and in the use of dyed polymers for making color filter arrays is the difficulty in aligning the different color filter layers for each color, so that they do not overlap in regions where overlaps are not desired.

Figure 1:
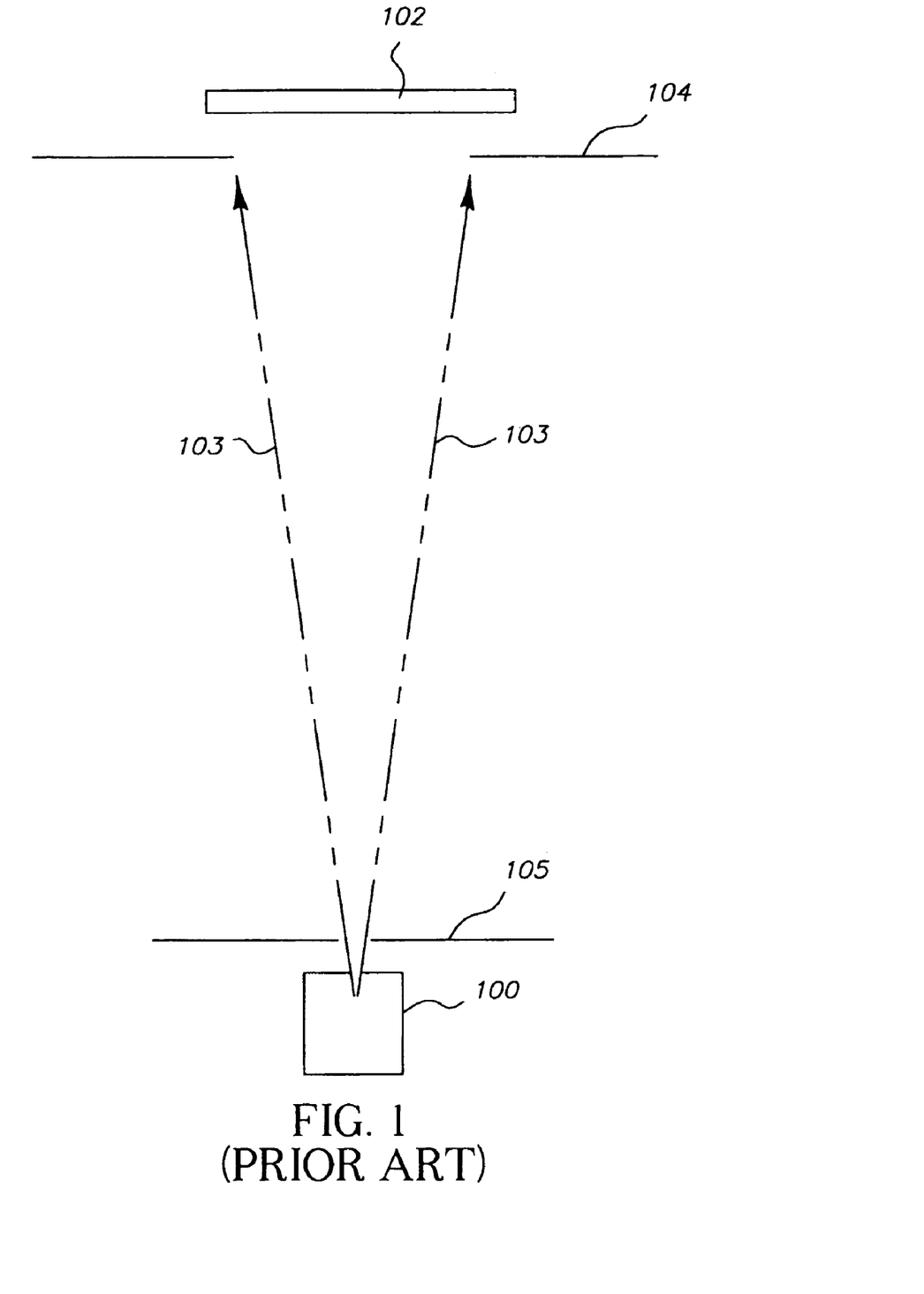
FIG. 1 shows a typical configuration for conventional physical vapor deposition (PVD)

Turning to FIG. 1, which shows a method for making coatings from evaporated organic colorants, a substrate 102 is positioned adjacent to an aperture mask 104. The aperture mask 104 provides an aperture over a portion of the substrate 102. An organic colorant which is to provide the coating is placed into a source boat 100, which is heated by passing an electric current through it. Alternatively, the boat 100 may be heated by the application of radiant heating from a suitably placed heat source. Upon being heated under reduced pressure, the colorant vaporizes and travels from the source, impinging on mask 105. The portion of colorant vapor which passes through the opening in mask 105 travels along the lines 103, and between those lines, depositing on the substrate 102 and mask 104.

There are a number of problems associated with this technique which involves depositing layers in a partial vacuum and is frequently referred to in the art as physical vapor deposition (PVD). In certain cases, it is difficult to control the thickness and uniformity of the colorant deposited on the substrate. The process of vacuum deposition of the colorant typically requires the use of an appropriate placement of sources or masks or moving substrate fixtures to produce a coating which is uniform. However, the colorant material may deposit on the mask and vacuum fixtures to such a degree that it flakes off, creating undesirable contamination and waste of the colorant and requiring frequent clean-up. In addition, the moving fixtures may generate undesirable particulate materials which may cause contamination of the substrate.

Some other shortcomings in making color filter arrays by the PVD process are the need to use a large source-to-substrate spacing which requires large chambers and large pumps to reach a sufficient vacuum, and the need for masks which cause low-material utilization and build-up on the mask with the concomitant contamination problems. Very specific off-axis source location relative to the substrate, which is sometimes needed for uniform coating, causes very poor material utilization. Still further, source replenishment problems exist for coating multiple substrates in one pump-down. When multiple layers are deposited, the process needs to be carefully monitored for the thickness of layers in the multiple colorant coatings in multiple cycles.

When multiple colored layers are used, the overlaps between the colors are determined by the relative positioning of the patterns formed by or in each. For example, when dispersions of colorants in photoresist materials are used, the pattern for each colored layer is determined by a patternwise exposure to light, followed by development. The precise orientation of the patternwise light exposure determines the orientation of the pattern formed in the colorant. Consequently, the precision of the alignment of the pattern of light which is formed by the photomask used to produce it is critical. Because of this, the alignment of successive patterns is often difficult, and overlaps between colors consequently hard to control. A basic discussion of photolithography is given in "Semiconductor Lithography Principles, Practices, and Materials," by W. M. Moreau, Plenum Press, New York, 1989.

Consequently, a need exists for a method of producing color filter arrays that overcome the above-described shortcomings.

SUMMARY OF THE INVENTION

It is an object of the present invention to provide an improved method for making color filter arrays which obviates the above difficulties, provides uniform colorant over the substrate, and is of low cost and high quality. The present invention provides a method of making a color filter array on a first substrate comprising the steps of coating a resist as an adhesion promoting layer over a first substrate; providing at least one heat transferable colorant layer having heat transferable colorant materials on a second substrate and positioning the second substrate such that the heat transferable colorant layers are in transferable relationship with but spaced apart from the first substrate; heating the second substrate sufficiently to cause substantially all of the heat transferable colorant materials to transfer across the space to the adhesion promoting layer on the first substrate; coating the first colorant layer with a silicon containing material; coating the silicon containing material with a photoresist layer and exposing and developing the photoresist layer to form an array of first openings over selected pixels; etching the silicon containing material, using the photoresist layer as a mask, to form an array of second openings in the layer of silicon containing material; etching the first colorant layer, using the layer of silicon containing material as a mask, to form an array of third openings in the first colorant layer; removing the photoresist layer; providing a second heat transferable colorant layer having heat transferable colorant materials on a third substrate and positioning the third substrate such that the heat transferable colorant layers are in transferable relationship with, but spaced apart from, the first substrate; heating the third substrate sufficiently to cause substantially all of the heat transferable colorant layers to transfer across the space so as to deposit the second colorant layers onto the layer of silicon containing material and into the third openings in the first colorant layers; removing the second colorant layers from non-selected regions leaving the second colorant layers in the third openings in the first colorant layers; and etching to remove the silicon containing material.

Advantages

Advantages of this technique include the ability to form colorant layers with tuned colors by co-deposition of a plurality of colorant materials in a single step, along with the ability to pattern the colorant layers. In addition, it provides for an evaporative purification of the colorant during the preparation of the transferable colorant coating and the effective utilization of evaporant materials with high quality uniformity over large areas. Other advantages include precise control of layer thickness, lower maintenance of deposition vacuum chambers, and minimal monitoring for the deposition process. Further, it offers the ability to coat at higher pressures and in smaller vacuum chambers which permit faster cycle time and the use of lower-cost vacuum equipment than for standard PVD techniques. Still further, it offers the ability to form colorant patterns which are non-overlapping, without the need for precise control over the alignment of photomasks.

It will be understood that the drawings are not to scale and have been shown for clarity of illustration.

DETAILED DESCRIPTION OF THE INVENTION

In the below described preferred embodiment, the invention will be described as a color filter array integral with a substrate having pixels, such as for image sensors. It is to be understood that the color filter array could be part of or coated onto a separate component in which case the substrate could be glass or any other transparent material having designated regions thereon.

Figure 2:
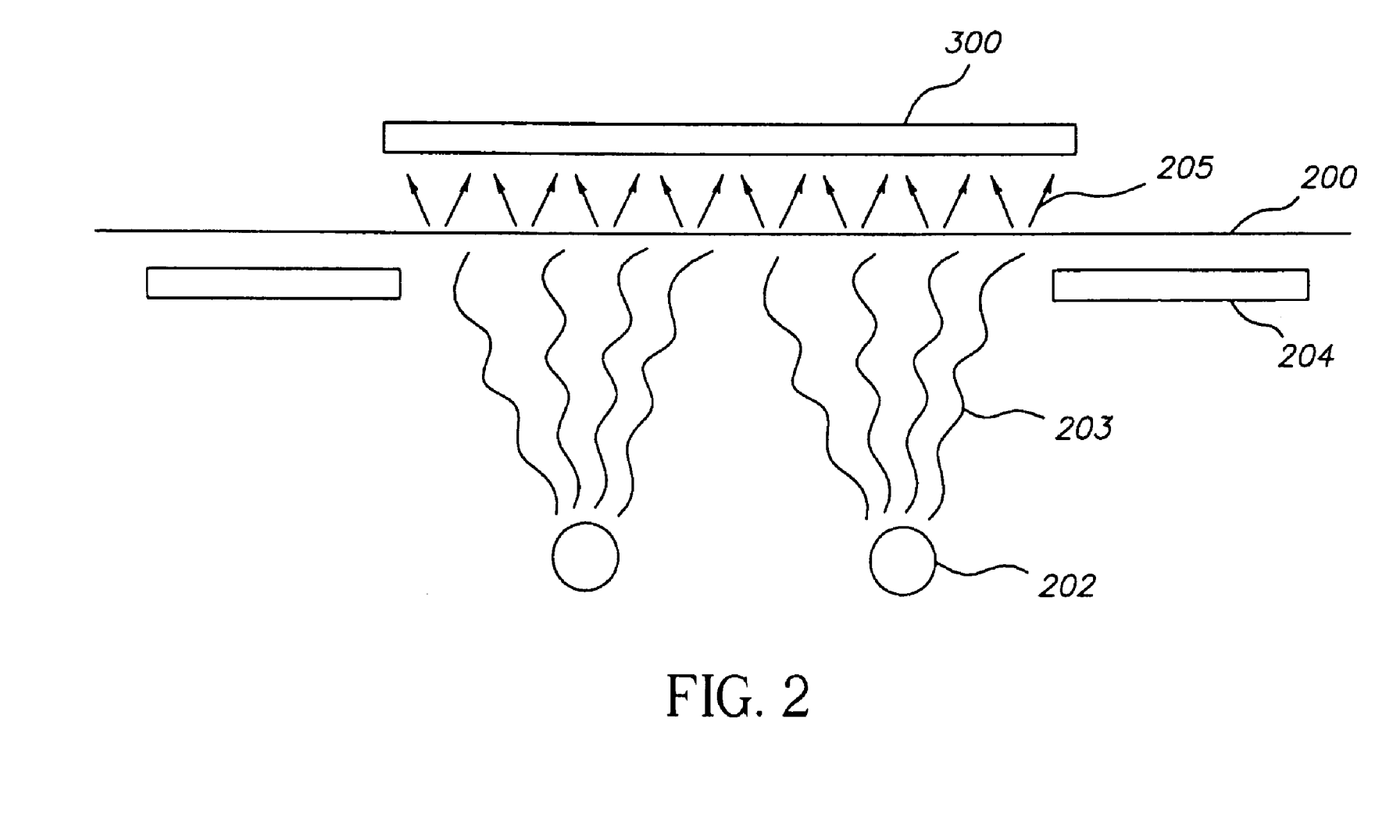
FIG. 2 shows a typical configuration for the thermal transfer of a material from an intermediate substrate to the final substrate, according to the present invention.

Referring to FIG. 2, there is shown a configuration for transfer of a material, which has been deposited as a coating on the second substrate 200, onto the first substrate 300 as indicated by the arrows 205 and which is promoted by heating with heat source 202 as indicated by radiant heat 203 acting through an aperture 204.

Figure 3A:
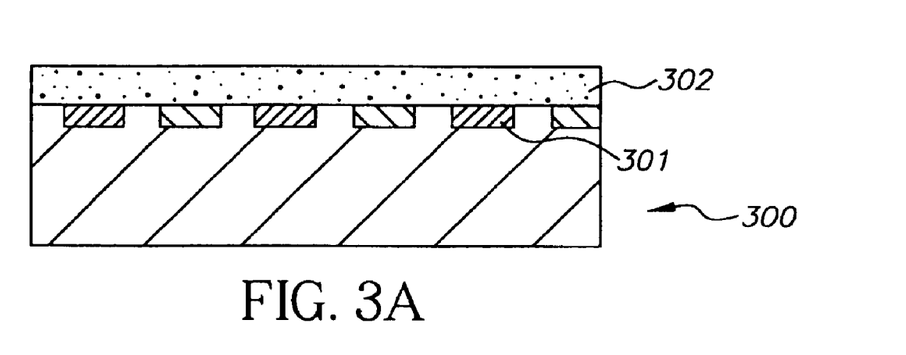
FIGS. 3A–K show various steps in a method according to the present invention for making color filter arrays.

Turning to FIG. 3A, the first substrate 300 is shown, which includes pixels 301 each of which are predefined to receive light filtered by a particular color. As is well understood to those skilled in the art, the substrate 300 may be a composite of different layers, and in particular may include an adhesion-promoting layer, shown as layer 302.

Figure 3B:
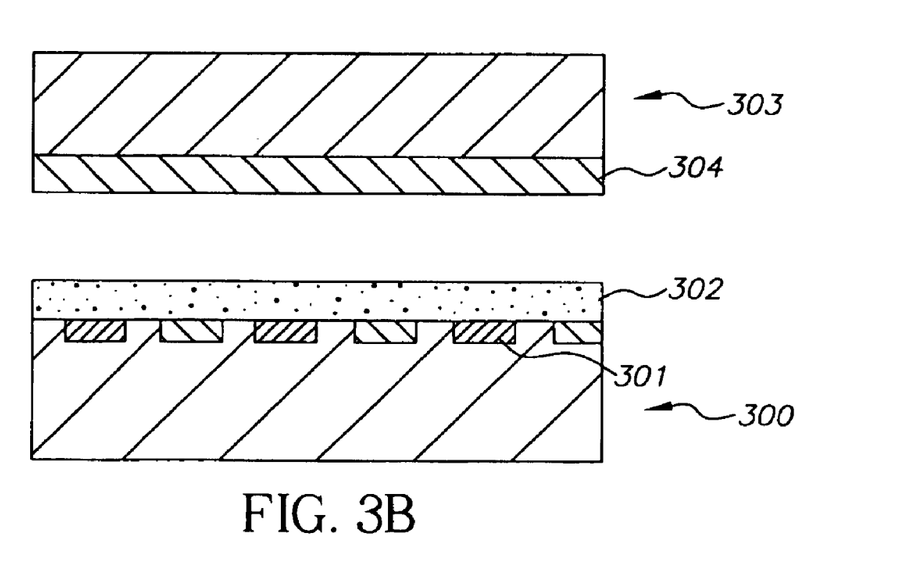

As shown in FIG. 3B, the substrate 300 is positioned in transferrable relationship to the second substrate 303 which includes colorant layers 304 previously deposited thereon.

Figure 3C:
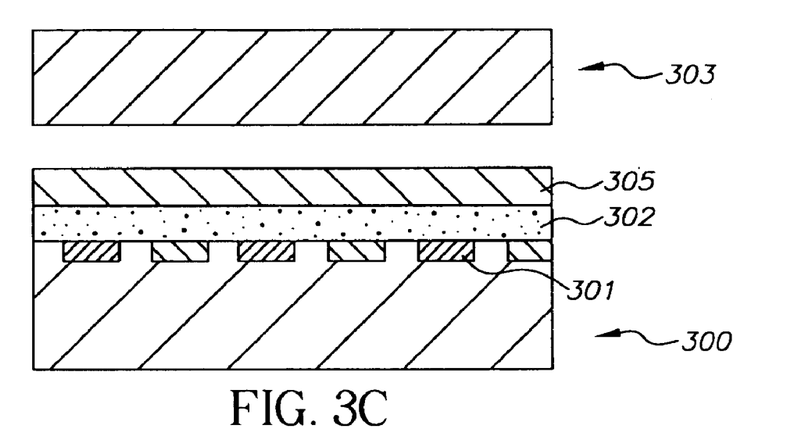

As shown in FIG. 3C, the colorant layers 304 are transferred onto the first substrate 300 forming colorant layer 305. This transfer is by heating in a partial vaccum as discussed in FIG. 2. It is appreciated that each colorant transfer may be repeated to form a stack of multiple colorants, particularly when subtractive colorants are used, such as cyan with yellow to form green.

In order to provide this transfer, heat is applied to the substrate 303. Typically, the substrate 303 is composed of metals, such as steel or aluminum or of a temperature-resistant plastic such as a polyimide film. Heating is often done by exposing the non-coated side of the substrate 303 to electromagnetic radiation of wavelengths which are absorbed by the substrate (or by the colorant coating in the cases where the substrate is substantially transparent) and are converted into heat by radiationless decay processes. The electromagnetic radiation may be applied over a large area simultaneously as from an extended lamp source, or it may be applied as a scanned beam as with a laser. It is appreciated that image-wise light exposure may be used to heat and transfer only a portion of the colorant coating. Another method used to heat the substrate 303 in order to transfer the colorant layers 304 is to pass an electric current through the substrate 303, particularly when the substrate 303 used is composed entirely or partially of metal. In still another method, the substrate 303 may be heated by direct contact with an object such as a metal block, a high temperature roller, or other such devices which can be heated or pre-heated to the required temperature and which can transfer heat to the substrate by direct thermal contact. Typical pressures and distances for the transfer of colorant are at about distance 3 mm to about 15 mm and less than or equal to 0.0001 Torr to about up to a distance of about 50 mm at pressures of less than or equal to 0.001 Torr.

Figure 3D:
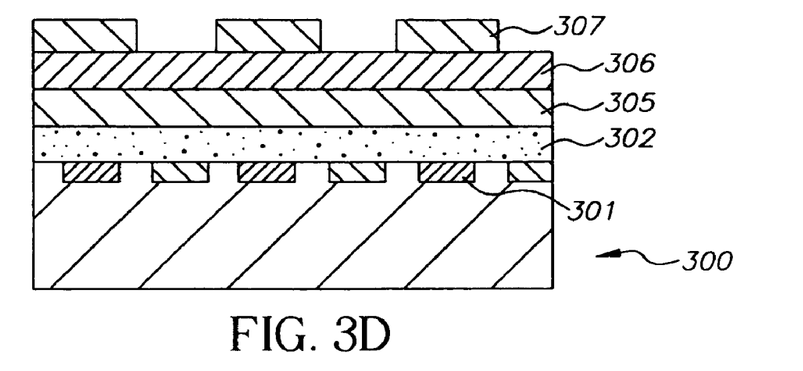

As shown in FIG. 3D, the colorant layer 305 is coated with a layer of silicon containing material 306 (for example spin-on glass) and a patterned photoresist layer 307, which is shown as having been patterned to form openings over selected pixels 301 It is appreciated that there may be additional rows of pixels in parallel with those shown, which are not explicitly represented in the drawing. In addition, it is appreciated that openings may not be formed over some or all the pixels in the adjacent rows.

Figure 3E:
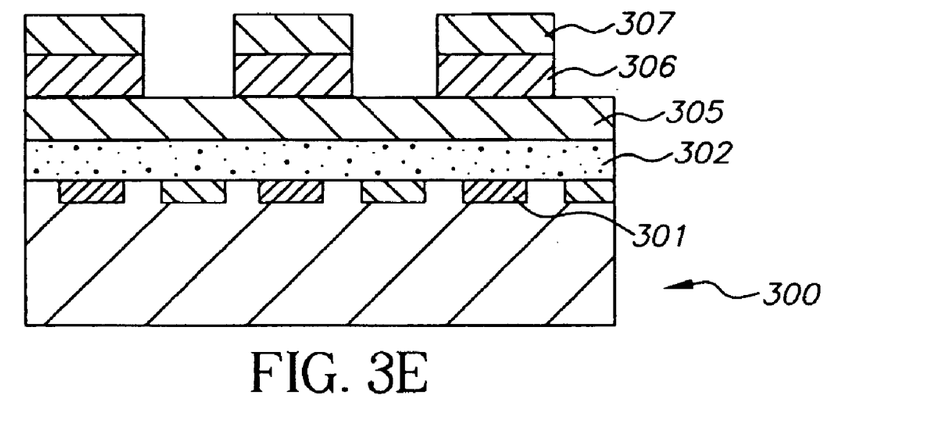

As shown in FIG. 3E, the openings in the patterned photoresist layer 307 are used as a mask for an etch to produce a pattern of recesses in the layer of silicon containing material 306.

Figure 3F:
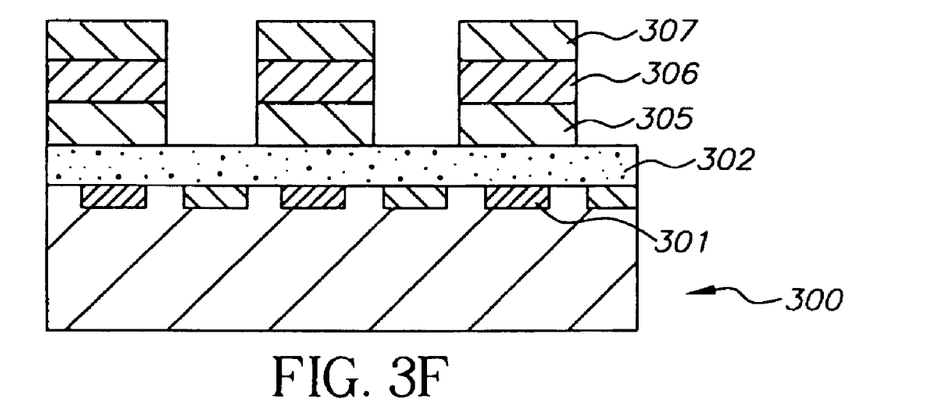

As shown in FIG. 3F, the etched layer of silicon containing material 306 is used as a mask for a plasma etch of the colorant layer 305, removing it from above pixels not selected to receive the particular color of colorant layer 305.

Figure 3G:
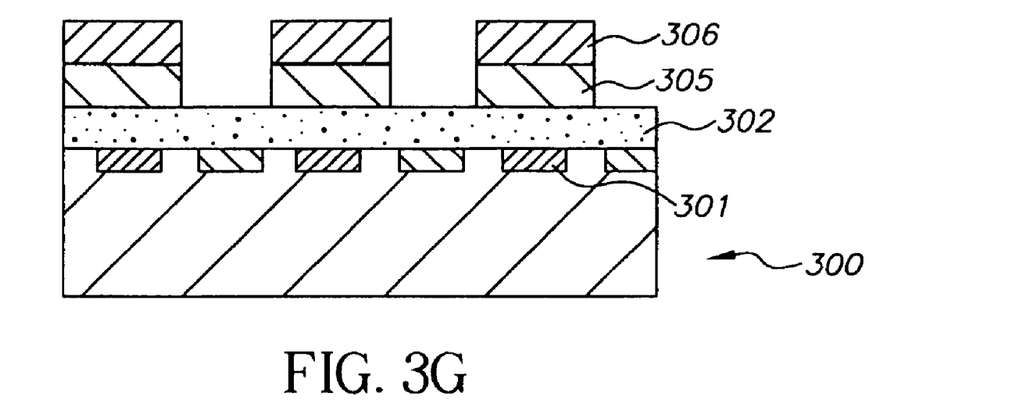

As shown in FIG. 3G, the photoresist layer 307 is removed.

Figure 3H:
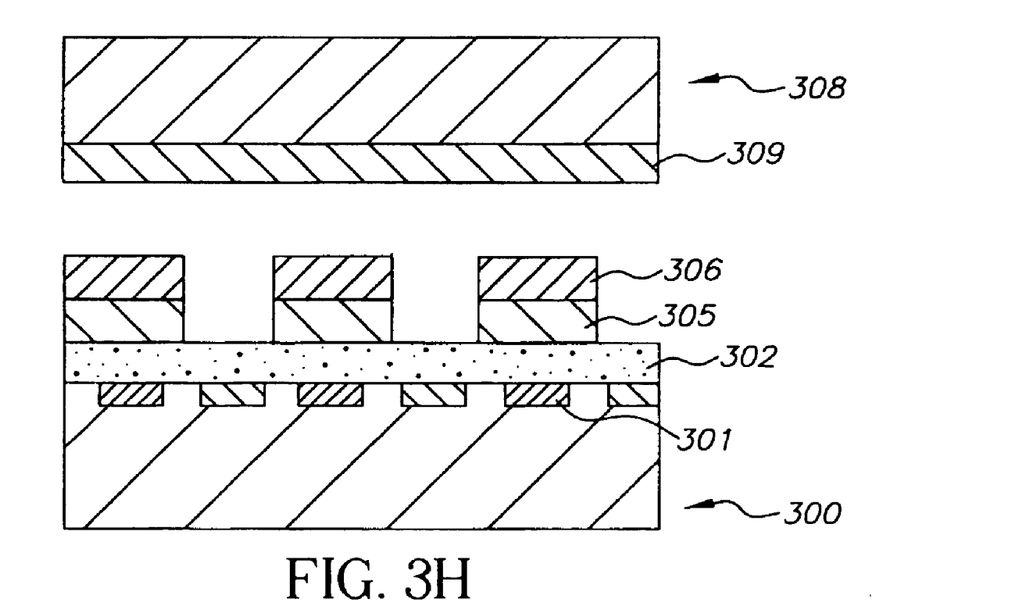

As shown in FIG. 3H, a third substrate 308 and colorant layers 309 are shown positioned relative to the substrate 300.

Figure 3I:
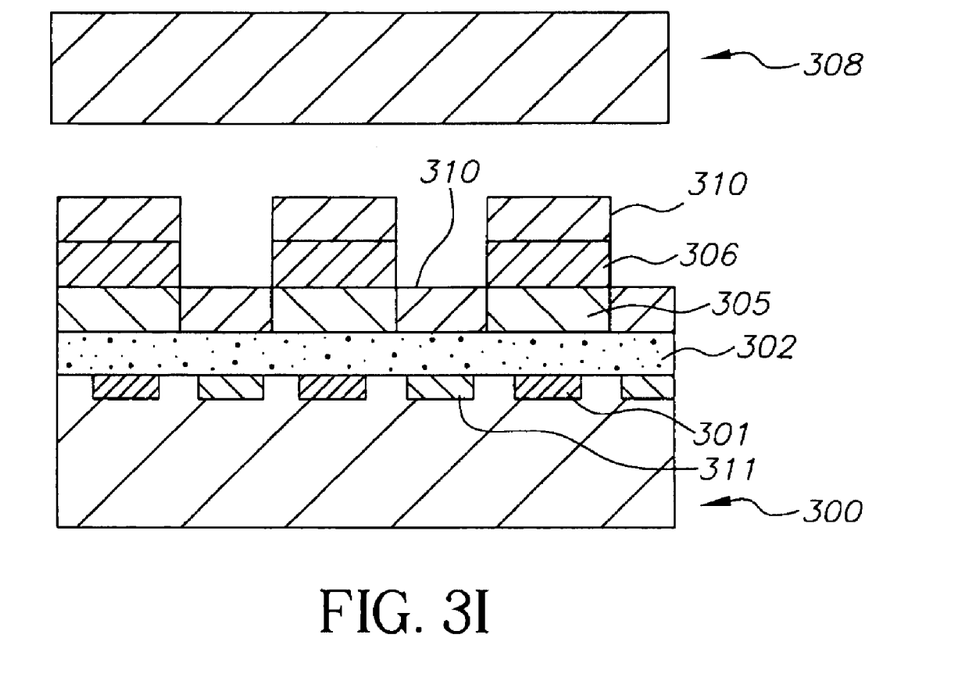

As is shown in FIG. 3I, the colorant 309 is transferred to substrate 300 which contains second pixels 311 selected to receive the particular color of colorant layer 309, forming colorant layer 310.

Figure 3J:
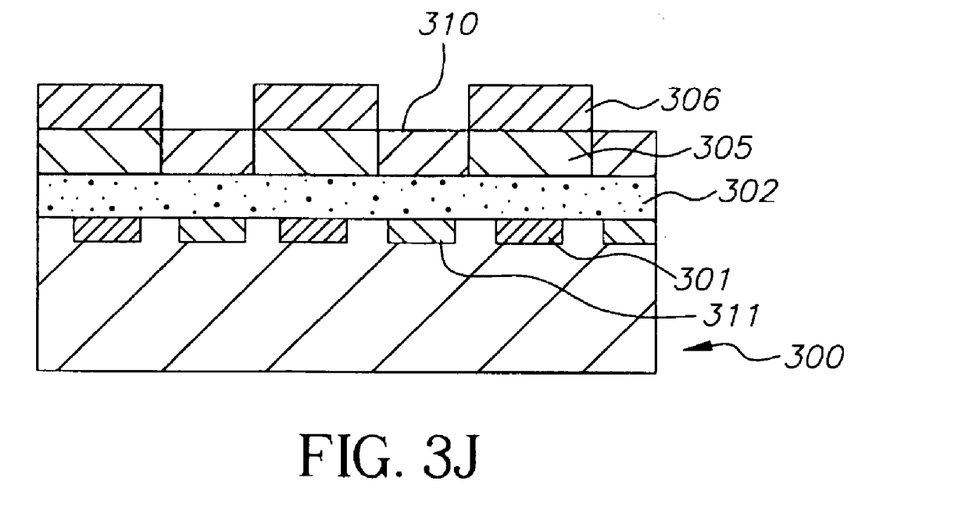

As shown in FIG. 3J, the portion of the colorant layer 310 which is now above the selected pixels 311 is removed by rinsing with solvent (preferably a low molecular weight volatile organic liquid), to leave the adhesion-promoting layer 302 and the colorant layer 310 above the selected pixels 311.

In order to make a color filter array with additional colors, the above steps represented in FIGS. 3D–3K may be repeated.

Figure 3K:
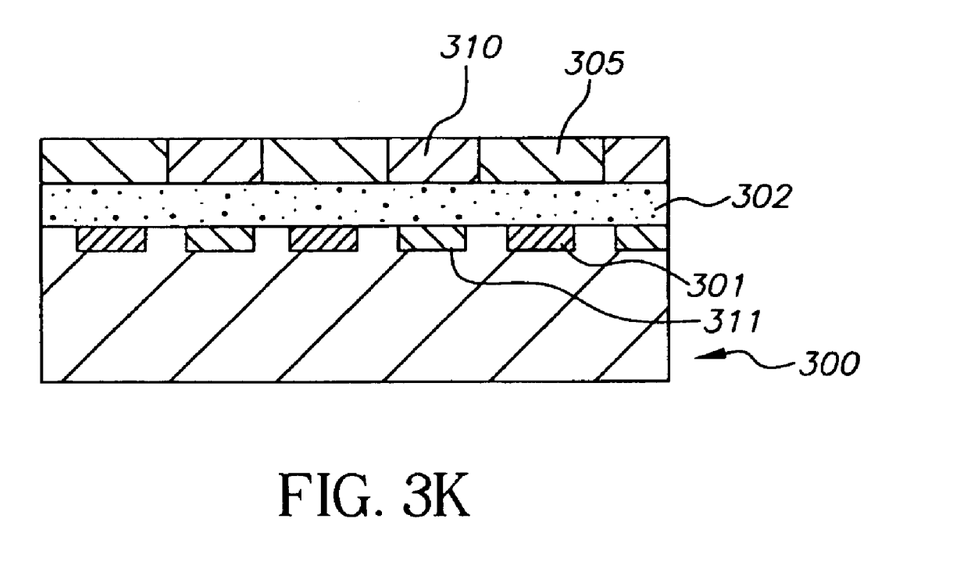

Alternatively, the layer of silicon containing material 306 may be removed by wet etching, as shown in FIG. 3K.

Colorants which are useful in the processes shown in FIGS. 3A–K include the following: phthalocyanines, such as Pigment Blue 15, nickel phthalocyanine, chloroaluminum phthalocyanine, hydroxyaluminum phthalocyanine, vanadyl phthalocyanine, titanyl phthalocyanine, and titanyl tetrafluorophthalocyanine; isoindolinones, such as Pigment Yellow 110 and Pigment Yellow 173; isoindolines, such as Pigment Yellow 139 and Pigment Yellow 185; benzimidazolones, such as Pigment Yellow 151, Pigment Yellow 154, Pigment Yellow 175, Pigment Yellow 194, Pigment Orange 36, Pigment Orange 62, Pigment Red 175, and Pigment Red 208; quinophthalones, such as Pigment Yellow 138; quinacridones, such as Pigment Red 122, Pigment Red 202, and Pigment Violet 19; perylenes, such as Pigment Red 123, Pigment Red 149, Pigment Red 179, Pigment Red 224, and Pigment Violet 29; dioxazines, such as Pigment Violet 23; thioindigos, such as Pigment Red 88, and Pigment Violet 38; epindolidiones, such as 2,8-difluoroepindolidione; perinones, such as Pigment Orange 43 and Pigment Red 194; monoazo pigments, such as Pigment Yellow 74 and Pigment Yellow 97; anthanthrones, such as Pigment Red 168; isoviolanthrones, such as isoviolanthrone; indanthrones, such as Pigment Blue 60; imidazobenzimidazolones, such as Pigment Yellow 192; pyrazoloquinazolones, such as Pigment Orange 67; ketopyrrolopyrroles, such as Pigment Red 254, Irgazin DPP Rubin TR, Cromophtal DPP Orange TR; Chromophtal DPP Flame Red FP (all of Ciba-Geigy); and bisaminoanthrones, such as Pigment Red 177.

The foregoing description has illustrated the embodiment of the present invention for making color filters via close space sublimation, employing an etch of the first pigment layer to form openings into which the subsequent layers are deposited.

EXAMPLES

In accordance with the above-stated invention, the following has been performed.

Example 1

A tantalum boat was half-filled with about 0.1 gm of Pigment Yellow 110 (Ciba-Geigy Corp.), placed under a partial vacuum of about $2.5\times10E-5$ Torr, and heated to a temperature of 375–417 degrees C. by passing an electric current through it. The material which evaporated from the boat was condensed on a section of stainless steel foil, about 25 microns thick, maintained at ambient temperature. The thickness of the deposit was monitored by an oscillating quartz crystal monitor, and was stopped when the thickness reached about 0.45 microns.

In a similar fashion, the coated steel foil was coated with about 0.15 microns of titanyl phthalocyanine (H.W. Sands Co.), at a pressure of about $2\times10E-4$ Torr and over a temperature range of 331–437 degrees C.

The double-coated steel foil was positioned about 2 mm from a glass slide, clamped between two electrodes, placed in a partial vacuum of about $3.3\times10E-5$ Torr, and heated by the passage of an electric current at 30 volts for 10 sec. All of the colorants were found to have transferred to the glass slide, giving a clear, continuous layer with an optical density above 3.0 at 695–715 nm. Attempts to mechanically separate the transferred colorants into distinct layers were unsuccessful.

Example 2

A similar procedure was followed as given in Example 1, except that the colorants were deposited in the reverse order. The colorants transferred completely to the glass slide, and appeared to form a clear, continuous layer.

Example 3

Commercially obtained titanyl phthalocyanine (Aldrich Chemical Co.) was placed in a tantalum boat and heated by passing electrical current through it, while maintaining a reduced pressure of about $1.1\times10E-4$ Torr in a vacuum bell jar. About 0.15 microns of the phthalocyanine were deposited onto a section of stainless steel foil, having a thickness of about 25 microns. The coated foil was used as the substrate for a second colorant layer in a second step, heating Pigment Orange 36 (Novoperm Orange HL-70 from Hoechst Celanese Corp.) in a tantalum boat at a pressure of about $1.3\times10E-4$ Torr. About 0.3 microns of the pigment were deposited on the phthalocyanine coating, forming a double-layer coating on the steel foil. The double-coated foil was then mounted about 2 mm distant from a section of a silicon wafer bearing an adhesion promoting layer of 1.0 microns of poly(methyl glutarimide) (PMGI from Microelectronics Chemical Corp.) and a patterned layer of AZ5214IR photoresist (Hoechst Celanese Corp.), and the foil was clamped between two electrodes. The assembly was subjected to a vacuum of about $1.1\times10E-4$ Torr, and electric current was passed through the foil (at 30 volts) for about 10 sec. Both the phthalocyanine and the Pigment Orange 36 transferred to the wafer. The wafer was subjected to 30 sec. in acetone in an ultrasonic bath (Branson 2200) which removed the photoresist and the pigment which was on top of it, leaving pigment features in the desired locations on the wafer.

Example 4

Commercially obtained copper phthalocyanine was heated by passing electrical current through the tantalum boat which contained it, while maintaining a reduced pressure of approximately $6\times10-5$ Torr in a vacuum bell jar. About 0.2 microns of phthalocyanine were deposited onto a section of stainless steel foil, having a thickness of about 25 microns. The coated foil was then mounted about 3 mm distant from a silicon wafer which had been spin-coated with about 1 micron of poly(methyl glutarimide), "PMGI" from Microelectronics Chemical Corp., and then coated with about 1.3 microns of photoresist AZ52141R (Hoechst Celanese Corp.) which was subsequently patterned and developed, and the non-coated side of the foil was positioned about 25 mm from an array of heat lamps (General Electric, Part no. QH500T3/CL) spaced about 30 mm apart. The assembly was subjected to a vacuum of about $6\times10E-5$ Torr and the heat lamps were powered for 60 seconds to transfer the phthalocyanine to the silicon wafer. The water was removed from the vacuum chamber and subjected to ultrasound in a tray of acetone for 90 seconds, using a Branson Model 3200 ultrasonic bath. The photoresist was completely removed by this treatment, leaving intact the copper phthalocyanine features in the desired pattern.

Example 5

Commercially obtained copper phthalocyanine was heated by passing electrical current through the tantalum boat which contained it, while maintaining a reduced pressure of about 6×10E−5 Torr in a vacuum bell jar. About 0.2 microns of phthalocyanine were deposited onto a section of stainless steel foil, having a thickness of about 25 microns. The coated foil was then mounted about 3 mm distant from a glass substrate, and the foil was clamped between two electrodes. The assembly was subjected to a vacuum of about 0.1 Torr, and electric current was passed through the foil (at 30 volts) for about 10 sec., causing the ends of the foil to reach a temperature of about 260 degrees C. and the phthalocyanine to transfer to the glass substrate.

The foregoing description as illustrates the embodiments most preferred for making color filters via close space sublimation. Variations of these embodiments will be readily apparent to those skilled in the art, accordingly the scope of the present invention should be measured in view of the appended claims.

Example 6

The process is exemplified in the following description: Samples of stainless steel foil (Type 304 stainless steel foil, 0.001 inches thick from Atlantic Metals and Alloys, Inc.) were coated with each of the pigments in a vacuum chamber maintained at about $1\times10^{-6}$ to $1\times10^{-4}$ Torr, coating a continuous roll of foil, transporting it uniformly at about 1–5 feet per min. over a boat source having a quartz body and a tantalum lid with a slot opening and a vapor baffle. The pigment was heated by passing electric current through the boat lid, giving the following approximate lid temperatures for each pigment: Pigment Blue 60, 570–588° C., Pigment Red 194 with Pigment Orange 43 (3:1 weight ratio), 551° C., Pigment Orange 36, 595–604° C., and vanadyl phthalocyanine, 690–696° C.

A silicon wafer having pre-formed image sensors within it was coated with polymethyl glutarimide (PMGI) by spin-coating from solution SF-11 (Microlithography Chemical Corp.) at 3500 RPM for 45 seconds. The PMGI was then cured by baking on a hot plate at 195° C. for 45 seconds to give a layer about 1.6 microns thick. The wafer was then mounted in a vacuum chamber, about 15 mm away from a piece of coated stainless steel foil, held essentially flat and parallel to the surface of the silicon wafer, the stainless steel foil having been previously coated with about 2300 Å of Pigment Orange 36 (Novoperm Orange HL from Clariant Corp.). At a chamber pressure of about $1\times10^{-5}$ to $5\times10^{-5}$ Torr, the foil was then heated quickly from the back side with an array of four 1000 watt quartz heaters (General Electric, Part no. QH500T3/CL), positioned about 25 mm from the non-coated side of the foil, and operated at half-power (110 VAC), such that the back side temperature increased over about 1 min. to momentarily exceed 200° C., transferring the Pigment Orange 36 onto the wafer. The layer of Pigment Orange 36 was similarly coated with about 2150 Å of vanadyl phthalocyanine (Eastman Organic Chemicals, catalogue number P9665, lot A821). The pigment was spin-coated with spin-on glass (Accuglass 311 from Honeywell Corp.) at 1000 RPM, followed by baking on a hot plate at 90° C. for 1 min., 150° C. for 1 min., and then 220° C. for 1 min., to give a layer about 5500 Å thick. The spin-on glass layer was spin-coated with photoresist HiPR6512 (Clariant Corp.) at 4800 RPM, following an on-track vapor prime with hexamethyldisilazane (HMDS). The photoresist layer was baked on a hot plate at 90° C. for 1 min. to give a layer about 1.2 μm thick. The photoresist is exposed through a first mask on a Perkin-Elmer Micralign 661 Scanner to 70 mJ and developed in OPD4262 developer (from Olin Microelectronic Materials Corp.) for about 45 sec. to form openings in the photoresist over the selected pixels in the image sensors. Openings in the spin-on-glass were formed by soaking in 5:1 BOE (with OHS) (Olin Microelectronics Materials Corp.) for 40 sec. The coated wafer is then subjected to 10 min. plasma etch in a TEGAL 915 plasma etcher operated at 400 W with oxygen atmosphere, to form openings in the pigment layer. The photoresist was removed by rinsing with acetone. The wafer was coated with about 4830 Å of a mixed coating made from a 3:1 mixture of Pigment Red 194 (Permanent Vat Red RRN from Clariant Corp.) and Pigment Orange 43 (Hostaperm Orange GR from Clariant Corp.) in a manner similar to that used for the first deposited pigments. The wafer was rinsed with acetone to remove the mixed pigment from the surface of the spin-on glass. In some cases, an ultrasonic bath was used to facilitate complete removal of unwanted red pigment. The green and red pigment layer was coated with spin-on glass (Accugalss 311) at 1000 rpm, and baked as given above. The spin-on glass was coated with photoresist as above, exposed, and developed to form openings over second selected pixels. The photoresist was removed with acetone. The wafer was coated with about 3728 Å of Pigment Blue 60 (Paliogen Blue L 6385 from BASF Corp) in a manner similar to that given above for the other pigments. Blue pigment which resided over spin-on glass was removed in acetone. The spin-on glass was removed by etching in 5:1 BOE for 2 min. The wafer was coated with Accuglass 512B, at 900 rpm, baking at 90° C. for 1 min., 150° C. for 1 min., and then 220° C. for 1 min., to give a layer about 8300 Å thick. The spin-on glass was coated with HiPR6512 as above, exposed and developed to form openings over the bond pad areas. Openings were etched in the spin-on glass through the openings in the photoresist in 5:1 BOE for 1 min. The wafer was flood-exposed to ultraviolet light on an OAI aligner for 100 sec., followed by flood-exposure to 125 mJ of visible light (G-line). The resists are simultaneously developed in OPD4262 for 45 sec.

The invention has been described in detail with particular reference to certain preferred embodiments thereof, but it will be understood that variations and modifications can be effected within the spirit and scope of the invention.

Parts list 100 source boat
102 substrate
103 lines/paths
104 mask
105 mask
200 second substrate
202 heat source
203 radiant heat
204 aperture
205 direction arrows
300 first substrate
301 pixels 302 adhesion-promoting layer
303 second substrate
304 colorant layers
305 colorant layers
306 layer of silicon containing material
307 patterned photoresist layer
308 third substrate
309 colorant layers
310 colorant layer
311 second selected pixels

What is claimed is:

1. A method of making a color filter array on a first substrate comprising the steps of:
   a) coating a resist as an adhesion promoting layer over a first substrate;
   b) providing at least one heat transferable colorant layer having heat transferable colorant materials on a second substrate and positioning the second substrate such that the heat transferable colorant layers are in transferable relationship with but spaced apart from the first substrate;
   c) heating the second substrate sufficiently to cause substantially all of the heat transferable colorant materials to transfer across the space to the adhesion promoting layer on the first substrate;
   d) coating the first colorant layer with a silicon containing material;
   e) coating the silicon containing material with a photoresist layer and exposing and developing the photoresist layer to form an array of first openings over selected pixels;
   f) etching the silicon containing material, using the photoresist layer as a mask, to form an array of second openings in the layer of silicon containing material;
   g) etching the first colorant layer, using the layer of silicon containing material as a mask, to form an array of third openings in the first colorant layer;
   h) removing the photoresist layer;
   i) providing a second heat transferable colorant layer having heat transferable colorant materials on a third substrate and positioning the third substrate such that the heat transferable colorant layers are in transferable relationship with, but spaced apart from, the first substrate;
   j) heating the third substrate sufficiently to cause substantially all of the heat transferable colorant layers to transfer across the space so as to deposit the second colorant layers onto the layer of silicon containing material and into the third openings in the first colorant layers;
   k) removing the second colorant layers from non-selected regions leaving the second colorant layers in the third openings in the first colorant layers; and
   l) etching to remove the silicon containing material.

2. The method of claim 1 further comprising the step of repeating steps d)–l) one or more times to form color filters of different colors.

3. The method of claim 1, wherein step (c) includes transferring at pressures $\leq 0.1$ Torr.

4. The method of claim 1, wherein step (c) includes transferring at a pressure of $\leq 0.001$ Torr and a distance of $\leq 50$ mm.

5. The method of claim 1, wherein step (c) includes transferring at a pressure of $\leq 0.0001$ Torr and at a distance of about 3 mm to about 15 mm.

6. The method of claim 1, wherein the colorant material is selected from the group consisting of: phthalocyanines; isoindolinones, benzimidazolones; quinophthalones; quinacridones; perylenes; dioxazines; epindolidiones; perinones; monoazo pigments; isoviolanthrones; indanthrones; imidazobenzimidazolones; pyrazoloquinazolones; diketopyrrolopyrroles; and bisaminoanthrones.

7. The method of claim 1, wherein the resist of step a) is polymethylglutarimide.

8. The method of claim 1, wherein the silicon-containing material is a spin-on glass.

9. The method of claim 1, wherein the etch in step f) is done by wet-etching.

10. The method of claim 1, wherein the etch in step g) is done by plasma-etching.

11. The method of claim 1, wherein the second colorant layers are removed by washing in a low molecular weight volatile organic liquid.

* * * * *